(12) United States Patent
Reilly (10) Patent No.: US 6,594,913 B1
(45) Date of Patent: Jul. 22, 2003

(54) PROTRACTOR

(76) Inventor: Paul Reilly, 560 N. Moorpark Rd., No. 150, Thousand Oaks, CA (US) 91360

( * ) Notice: Subject to any disclaimer, the term of this patent is extended or adjusted under 35 U.S.C. 154(b) by 0 days.

(21) Appl. No.: 10/001,865

(22) Filed: Nov. 20, 2001

(51) Int. Cl.[7] ................................. G01B 3/56
(52) U.S. Cl. .............................. 33/534; 33/471
(58) Field of Search ...................... 33/1 N, 1 PT, 33/471, 534, 536, 465, 468, 469, 640

(56) References Cited

U.S. PATENT DOCUMENTS

| | | | | |
|---|---|---|---|---|
| 346,519 A | * | 8/1886 | Tybjerg | ........................ 33/471 |
| 2,594,574 A | * | 4/1952 | Marsden | ....................... 33/471 |
| 3,788,633 A | * | 1/1974 | Cho | ............................. 33/534 |
| 4,358,898 A | * | 11/1982 | Johnson | ........................ 33/1 N |
| 4,611,407 A | * | 9/1986 | van Gorp | ..................... 33/471 |
| 5,097,601 A | * | 3/1992 | Pollak et al. | ................... 33/471 |
| 5,121,553 A | * | 6/1992 | Boerder | ........................ 33/465 |
| 5,187,877 A | * | 2/1993 | Jory et al. | ...................... 33/471 |
| 6,256,900 B1 | * | 7/2001 | Myers | .......................... 33/471 |
| 6,453,568 B1 | * | 9/2002 | Hymer | .......................... 33/471 |

* cited by examiner

*Primary Examiner*—G. Bradley Bennett
(74) *Attorney, Agent, or Firm*—Allen A. Dicke, Jr.

(57) ABSTRACT

The protractor has a body which has three reference surfaces, two being parallel and one being at right angles to them. A web between the surfaces carries a protractor dial which is rotatable on the protractor body. The dial carries a reference surface and can be set in position by means of a visual indicia, by sine measurement, or by memory links. Great accuracy can be achieved by use of the sine measurement.

19 Claims, 8 Drawing Sheets

FIG. 18

PROTRACTOR

FIELD OF THE INVENTION

The protractor is a device which can accurately establish an angle or can accurately determine the size of an existing angle. It is particularly applicable to setting or reading the angles on tools, machinery and parts.

BACKGROUND OF THE INVENTION

In many professions and crafts, it is necessary to establish accurate angular measurements. In setting up machinery to make a proper cut, it is often necessary to precisely set the angle of a cutting tool with respect to a table.

One piece of conventional angle measuring equipment is the well-known protractor. A reference line on the protractor is set parallel to the reference base. The angularity to be measured is read against a protractor dial. The accuracy of such a protractor is limited by the size of the protractor arc. The larger the protractor arc, the more accurately the angle can be read.

If more accurate angular readings are required, it is necessary to go to trigonometric relationships. A triangle is established with the angle in question at the apex. Either the adjacent side or the hypotenuse are known, and the opposite side is calculated from the tangent or sine tables. With the use of gage blocks and known lengths, accurate angular setups can be achieved. However, such setups are complicated and time-consuming.

SUMMARY OF THE INVENTION

In order to aid in the understanding of this invention, it can be stated in essentially summary form that it is directed to a protractor which has a body having at least one reference edge. A dial having a dial reference surface is pivoted on the body. When the body reference surface and dial reference surface are at a known angle, this angle is indicated by indicia therebetween. In addition, there is a measuring surface on the body and a measuring surface on the dial. These measuring surfaces are at a known position with respect to each other when the body and dial reference surfaces are at a known angle with respect to each other. Adjusting the dial on the body to a known distance between measuring surfaces establishes a known angle between the reference surfaces.

It is, thus, a purpose and advantage of this invention to create a two-piece protractor, each having a reference surface so that the relative angle therebetween may be read when the reference surfaces are at a particular angular relationship.

It is another purpose and advantage of this invention to provide a protractor which has measuring surfaces on both the body and dial so that the relative position of those surfaces is related to the angularity between the reference surfaces on the body and on the dial.

It is another purpose and advantage of this invention to produce a protractor which can establish angles in the analog mode by direct reference to an angular scale and a digital mode by measuring the distance between measuring surfaces and applying trigonometric relationships.

It is another purpose and advantage of this invention to provide a protractor which has a body and a dial pivoted thereon with settable stops so that the dial can be returned to a previously determined position with respect to the body.

It is a further purpose and advantage to provide a protractor which has six faces or reference surfaces. Two faces (front and back) being parallel and four sides perpendicular to those faces and also parallel or perpendicular to each other.

It is a further purpose and advantage to provide two reference surfaces which are parallel, together with a pivoted dial on the body so that the angular relationship of the dial with respect to any one of the four reference surfaces is known.

It is a further purpose and advantage to provide a protractor with a fixed index hole in the dial and a movable link with an index hole attached to the body. These holes when aligned with a pin and locked allow preselected angle retrieval.

Other purposes and advantages of this invention will become apparent from a study of the following portions of the specification, the claims and the attached drawings.

DESCRIPTION OF THE PREFERRED EMBODIMENT

Figure 1:
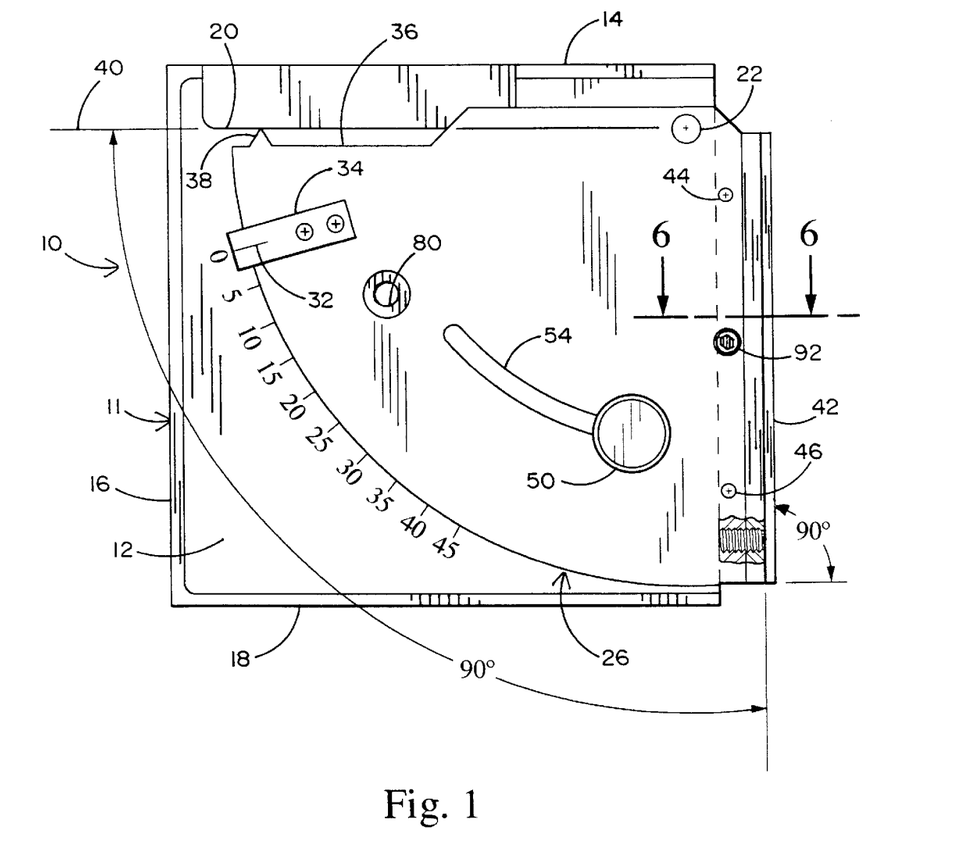
FIG. 1 is a front view of the protractor of this invention shown in the zero angle position.
Figures 3, 4:
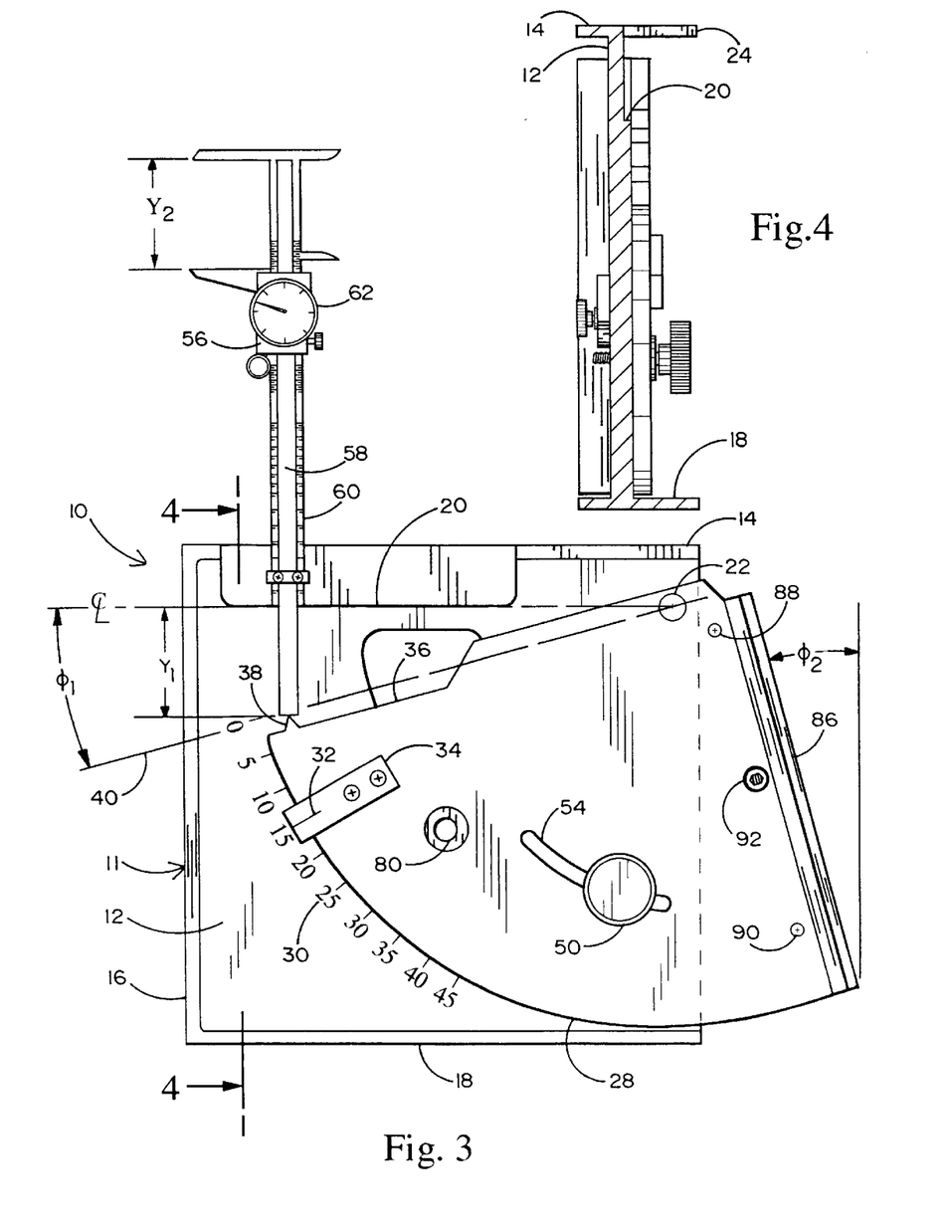
FIG. 3 is a front view of the protractor wherein its dial is positioned at 15° with respect to the body and showing a dial caliper making the measurement.
FIG. 4 is a section taken along the line 4—4 of FIG. 3.
Figure 8:
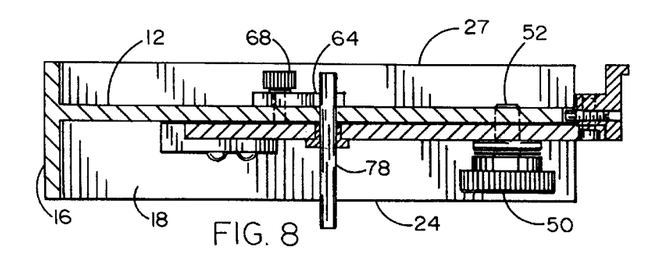
FIG. 8 is a downwardly looking section taken generally along the line 8—8 of FIG. 7.
Figure 9:
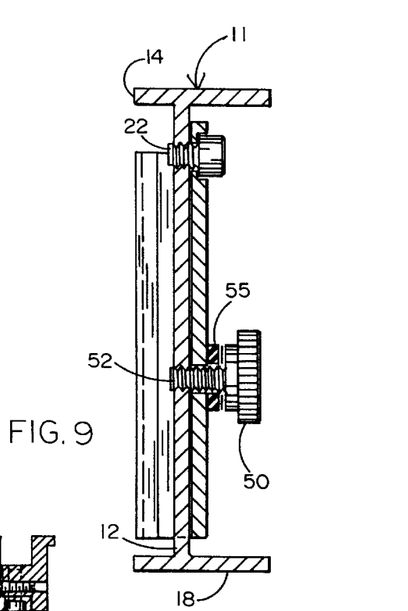
FIG. 9 is a rightward looking section taken generally along the line 9—9 of FIG. 7.

The protractor of this invention is generally indicated at 10, see FIG. 1. The best overall views of the protractor 10 are seen in FIGS. 1, 3, 5 and 7. The protractor 10 is of rectangular shape and has a center web which has three flanges integrally formed therewith. The three flanges are top flange 14, end flange 16 and bottom flange 18. These flanges each have a substantially planar surface. FIGS. 4, 8 and 9 show that the web is not centrally positioned within the flanges. These flanges each have a surface which is as substantially planar as is reasonably cost-worthy to manufacture. Furthermore, the surface of flange 16 is substantially at a right angle to the surfaces of flanges 14 and 18. These surfaces are referred to as side b, side c and side a, respectively, in FIGS. 13-18.

Figure 2:
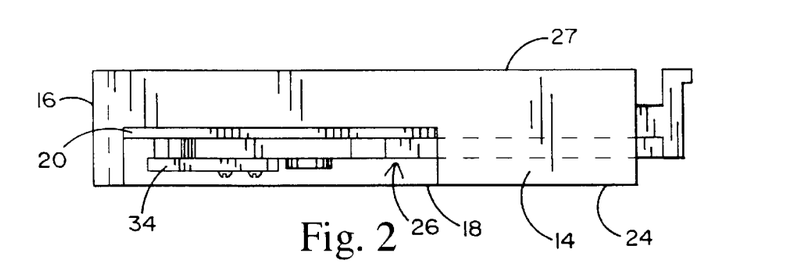
FIG. 2 is a top view thereof.
Figure 7:
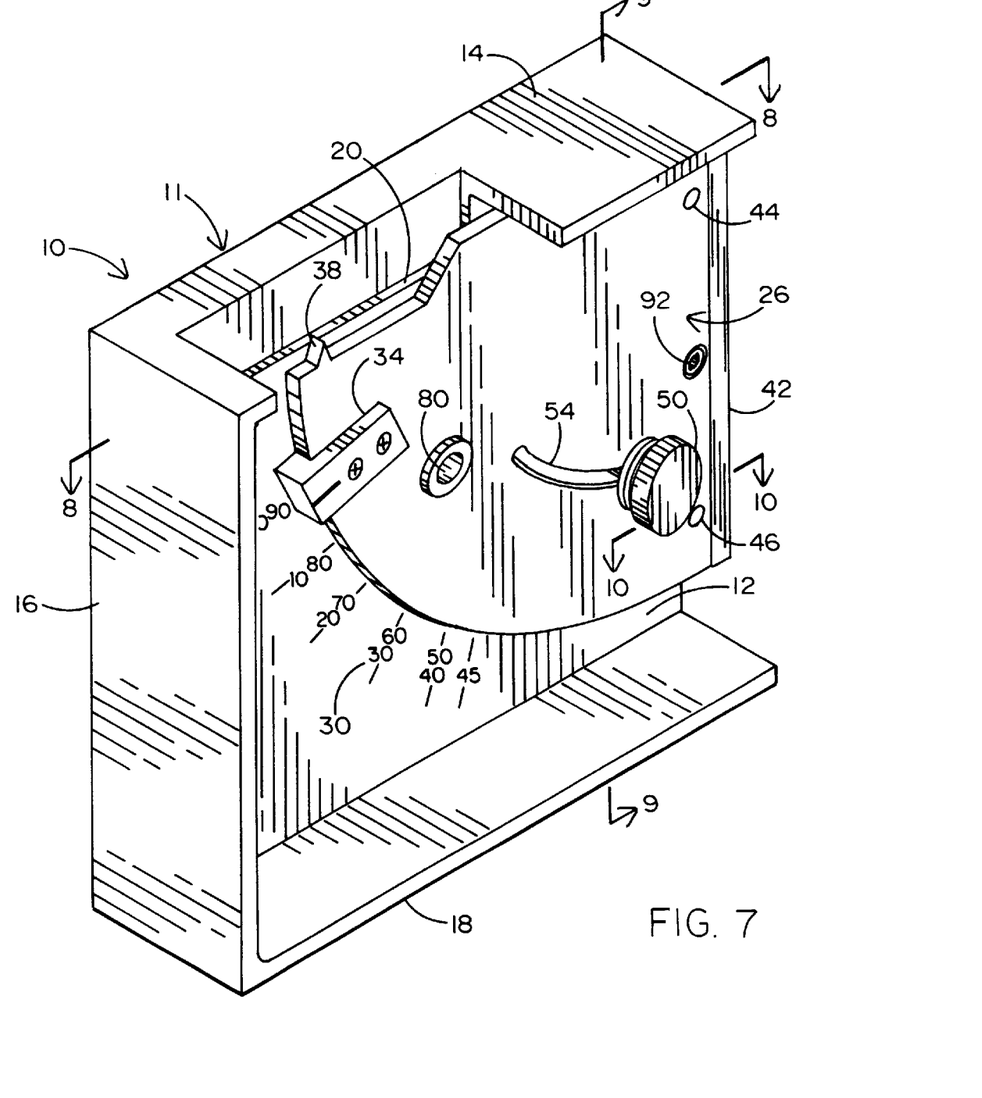
FIG. 7 is an isometric view from the top/left/front of the protractor of this invention.

A portion of the top flange 14 is cut away, as seen in FIGS. 1, 2 and 7. A portion of the center web 12 is also cut away to form a shelf 20. The shelf 20 is planar and is parallel to the planar surface of top and bottom flanges 14 and 18. Pivot pin 22 has its center line lying in the plane of shelf 20. In addition, the front edges of the flanges define a front planar surface 24, and the rear edges of the flanges define a rear planar surface 27, see FIG. 8. These planes are at a right angle to the planes of the surfaces of the flanges, and parallel to each other. Thus, the structure defines a rectangular body 11 which can rest on any one of its six faces, with the faces being mutually perpendicular.

A preferred material for the body 11 of the protractor 10 is metal due to its stability and long life. Because of its light weight and limited oxidation, aluminum is suitable for situations in which care will be taken with the instrument. Some modern synthetic polymer composition materials have the rigidity, strength and dimensional stability to be suitable for use in construction of the protractor of this invention.

Protractor dial 26 is pivoted on pivot pin 22. As seen in FIG. 9, this pivot pin permits rotation of the dial against the face of the center web 12, but limits radial motion so that the dial turns in a constrained arc. The curved edge 28 of the dial 26 is at a constant radius with respect to the pivot pin 22, see FIG. 3. The center web 12 carries a series of indicia 30 which are also arranged at a constant radius with respect to the pivot pin 22. The indicia show degrees of angular position of the dial with respect to the body. A witness line 32 is on pointer bar 34 to indicate the angularity of the protractor dial with respect to the protractor body. The pointer cursor is attached to the protractor by screws so that the witness line can be adjusted to zero when the dial 26 is in the zero position.

Part of the top edge of the dial is cut back to form a recess 36, which is below the radial line 40 extending through the rotational center of the dial at the axis of pivot pin 22. Extending up from the recess is measuring point 38 which has its tip on the radial line 40. FIG. 1 shows the zero position defined as the rotational position of the dial where the radial line 40 through the tip of point 38 lies in line with shelf 20 and parallel to surfaces 14 and 18. This is the position shown in FIGS. 1 and 7. When the point 38 is even with the shelf 20, the cursor 34 is adjusted so that its witness line 32 aligns with the zero mark of the indicia.

Figure 6:
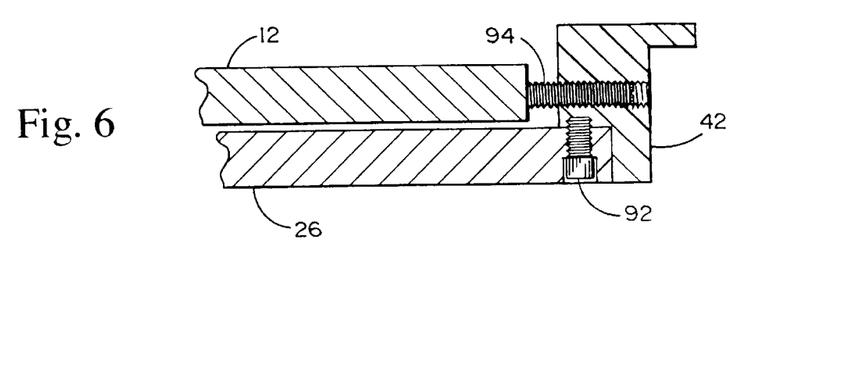
FIG. 6 is an enlarged section taken along the edge of the dial, as generally seen along the line 6—6 of FIG. 1, with parts broken away.

The right end of the dial carries reference bar 42, see FIG. 6, which is removably mounted on the edge. The bar is attached with locating pins 44 and 46, see FIG. 7, which also locate the bar in proper position on the dial. It is the face of this reference bar which provides the angular measuring face. The dial is manufactured so that the plane on the face of the measuring bar is at a right angle to the line between the measuring point 38 and the center of pivot pin 22. This is a permanent right angle.

The reference bar can be removed, rotated and remounted by means of a cap screw 92, to relocate the reference contact lip. Stop screws 94 or 102 provide a stop for the dial at zero position for each orientation of the reference bar. The angular position of the dial is such that the face of the reference bar is parallel to the face of the end flange 16 and is a right angle to the faces of top and bottom flanges 14 and 18 when the witness line 32 is set to zero. Whichever of the reference bar stop screws 94 or 102 is located at the base near surface 18 prevents clockwise rotation of the dial from this location. Angles other than 0 degrees can be created by rotating the protractor dial 26 so that the witness line is directed at the desired angle, such as the 15 degrees shown in FIG. 3.

Figure 10:
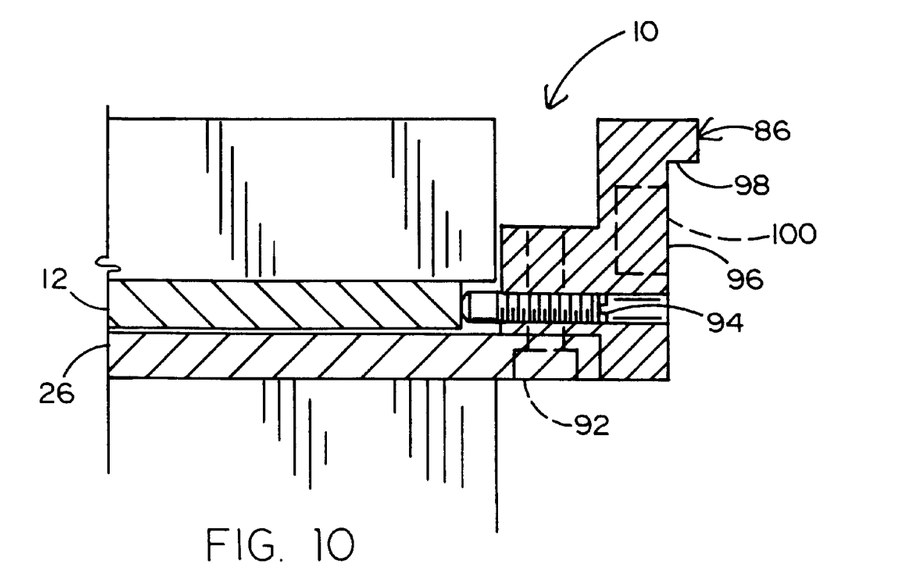
FIG. 10 is an enlarged downwardly looking section, with parts broken away, taken generally along the line 10—10 of FIG. 7.
Figure 11:
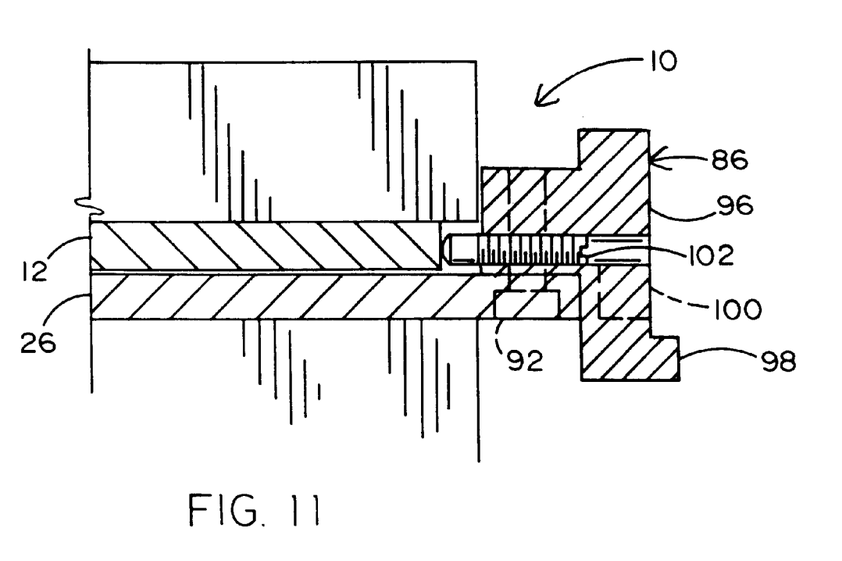
FIG. 11 is a view similar to FIG. 10 showing a different assembly orientation.
Figure 12:
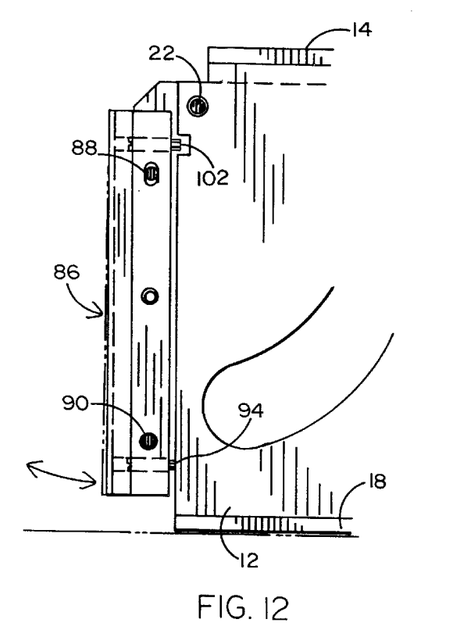
FIG. 12 is a rear view of the protractor showing the adjustable stop on the protractor dial.

It is sometimes desirable to utilize the reference bar with the lip on the indicia side of the protractor, as seen in FIG. 11, and sometimes it is helpful to have the lip away from the indicia side, as seen in FIG. 10. The reference bar can be removed by loosening its machine screw 50, turned over and reattached. In that case, the opposite stop screw 102 is utilized as the dial stop. The web 12 is cut away so that the stop screw closest to the pivot pin does not interfere with dial positioning. Instead, the stop pin farthest away from the pivot pin stops the dial at the zero position (see FIG. 12).

Lock knob 50, as seen in FIGS. 8 and 9, has a threaded stud 52 which is engaged in a threaded hole in the center web 12 of the body. The threaded stud extends through an arcuate slot 54 in the dial. The arcuate slot is an arc around the rotational center of the dial. Friction washer 55 is engaged under the lock knob 50 so that, when the lock knob is tightened, the dial is clamped against the center web in the selected position.

If a more accurate setting of the dial is required than can be achieved by witness line on indicia, a digital mode of measurement can be performed, by using machinist's ruler, dial calipers or depth gage. The caliper 56 is conventional. It adjusts for measuring outside and inside diameter and has a depth measuring rod 58. The depth measuring rod extends out of the lower base of the caliper body 60 as the jaws are opened. Thus, $Y_1=Y_2$. The caliper 56 has a measuring indicator thereon, such as a caliper dial 62 which shows the amount of opening. When the base of caliper body 60 is set on shelf 20 and the depth measuring rod 58 of the caliper is engaged by the measuring point 38, then distance $Y_1$ is measured and the angle $\phi$ can be calculated. The distance from the measuring point 38 to the axis of rotation in pivot pin 22 is known. If that distance is 1, then the measured distance from the measuring shelf 20 to the measuring point 38 will be the sine of the angle $\phi 1$. Of course, this angle is the same as the angle $\phi 2$. Again, with the distance from the measuring point 38 to the axis of rotation in pivot 22 being 1, then the desired angle can be looked up in the trigonometry sine tables and the caliper 56 can be set to this value. With the caliper 56 in the position shown in FIG. 3, the dial 26 is rotated into contact and the dial is then locked in place by means of the lock knob. In this way, a very accurate angle setting can be easily accomplished.

Figure 5:
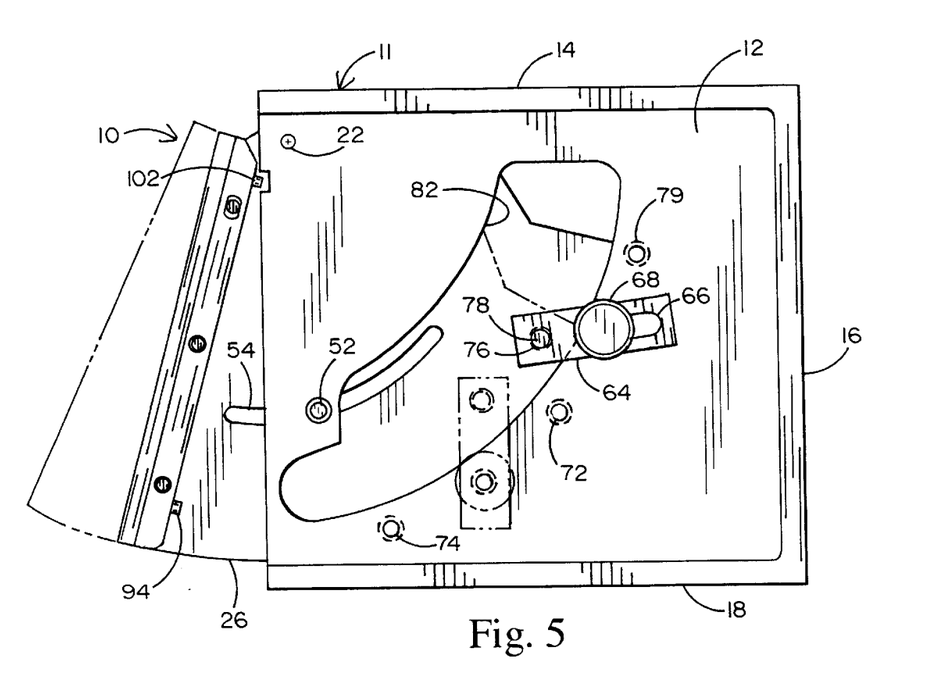
FIG. 5 is a back view of the protractor with its dial in the position shown in FIG. 3.

If it is desired that the protractor dial be set to an angle and later returned to the same angle, it can be readily accomplished by means of memory link 64, see the back of the protractor 10 in FIG. 5. The memory link has a slot 66 therein through which is engaged the threaded shank under lock knob 68, see FIG. 8. This knob is similar to the knob 50 and engages in the threaded hole in the center web 12. There is a series of thread holes into which the lock knob can be tightened. In FIG. 5, there are five sets of threaded holes with three of them indicated at 70, 72 and 74. The lock knob can attach the memory link over any one of these holes. In fact, the memory link 64 is shown in phantom lines over the threaded hole between holes 72 and 74 to show one of the alternate positions. The outer end of memory link 64 has a memory pin hole 76 therein in which is positioned memory pin 78. Dial 28, see FIG. 3, also has a memory pin hole 80 therein. In the protractor dial, the memory pin hole 80 may be in a hardened bushing (such as shown in FIGS. 1 and 3) in order to minimize wear.

As is best seen in FIG. 5, web 12 has an access opening 82 cut therein so that in any angular position of the dial with respect to the protractor body, the memory pin hole 80 will be visible from the back (see FIG. 5). Thus, when the memory of a particular angle is desired, after the dial 26 is set at the desired angle, a memory pin 78 is thrust through the hole 80 and a memory link 64 is engaged thereover. The memory pin 78 engages through both memory pin holes, and the memory link 64 is secured in place by tightening the knob 68. The memory pin 78 can then be removed and the dial 28 rotated to a new angle. When it is desired to recover that angle stored memory, the dial is rotated until the two memory pin holes are in alignment and the memory pin is thereupon reinstalled. If there are several angles to be remembered, several memory links can be employed.

Figure 14:
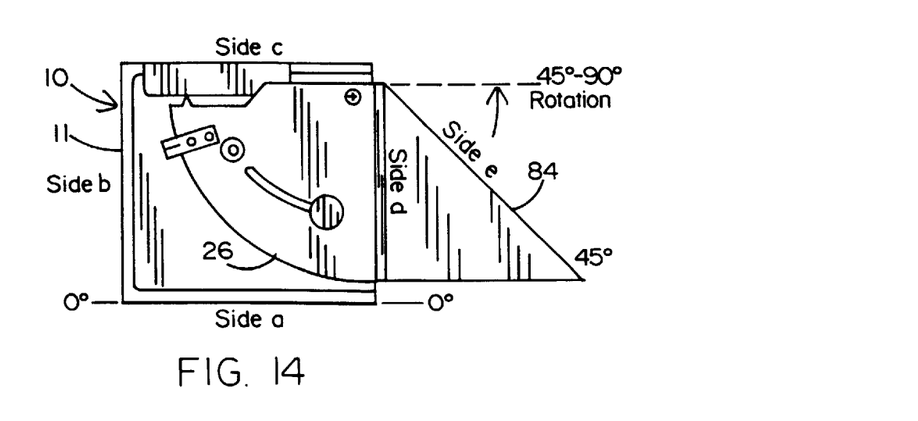
FIG. 14 is a front view of the protractor, on a reduced scale, showing taking a measurement between 0° and 45° with respect to the vertical, utilizing a 45° triangle, relative to side b.
Figure 16:
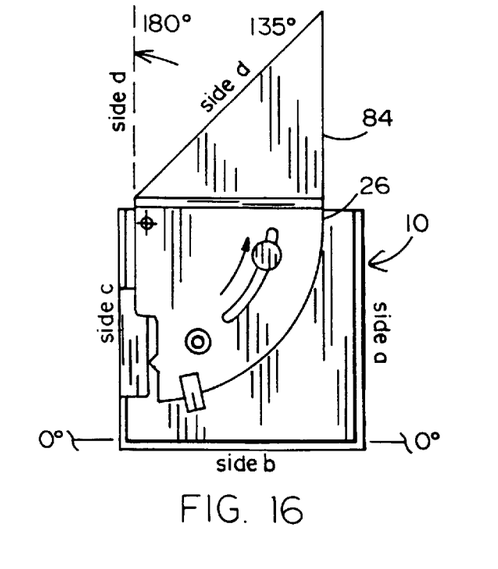
FIG. 16 shows the measurement of an angle between 135° and 180° with respect to the vertical, utilizing a 45° triangle, relative to side c.
Figure 17:
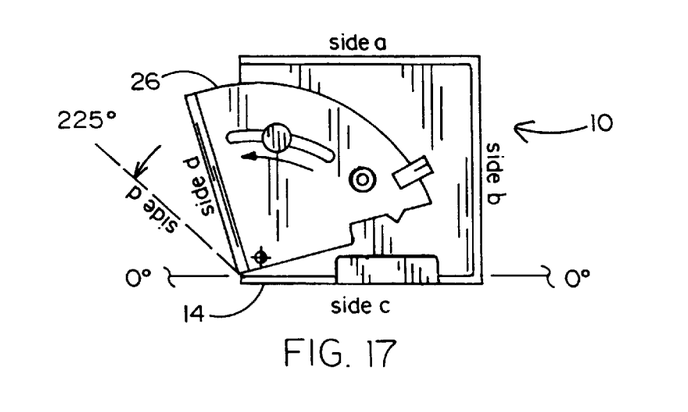
FIG. 17 shows the measurement of an angle between 180° and 225° with respect to the vertical, relative to side b.
Figure 18:
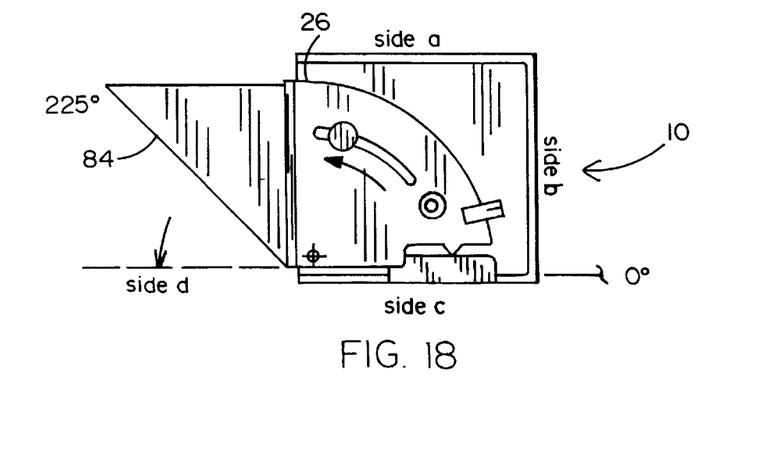
FIG. 18 shows the manner in which the protractor is used in association with a 45° triangle to measure an angle between 225° and 270°, with respect to the vertical, relate to side b.

Even though the dial 26 can be rotated only through 45°, by the use of the different faces on the protractor body and through the use of a 45° triangle, the protractor 10 can be employed to set or measure through 360°. A 45° triangle 84 is shown in FIGS. 14, 16 and 18. To utilize the triangle 84, it is convenient that the reference bar have a lip. Reference bar 86 attaches to the dial 26 by means of locating pins 88 and 90 inserted in the edge of the dial and machine screw 92 for removably attaching the reference bar to the dial, see FIG. 3. One end of the reference bar has a slot, seen in FIG. 12, to accommodate the pin 88 to permit differential expansion. Each end of the reference bar has a stop screw, with the lower end stop screw 94 being engaged against the center web 12 in FIGS. 8 and 12. The reference bar 86 has a flat surface 96, which serves as its measuring face. Lip 98, see FIGS. 10 and 11, is an outstanding flange. The reference bar 86 is preferably made of steel and at least one magnet 100 is inset into the reference bar. When the triangle 84 is made of steel, it is magnetically attracted to and clings to the measuring surface 96. The lip 98 assures that the plane of the triangle is perpendicular to the rotational axis of the dial.

Figure 13:
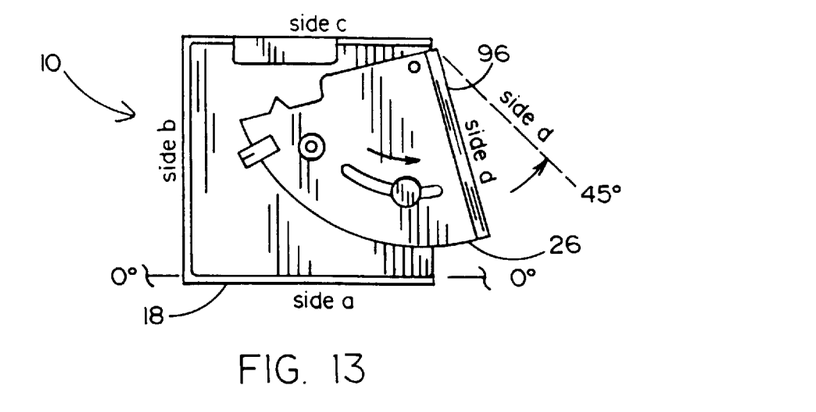
FIG. 13 is a front view of the protractor showing it resting on side A as a reference and measuring an angle between 0° and 45° with respect to the vertical, relative to side b.

By utilizing the three fixed faces of the triangle and the reference surface on the movable dial, together with a 45° triangle, all angles between 0° and 360° can be set or measured. It is first presumed that there is a plane surface upon which the protractor 10 can rest. In FIG. 13, this surface is below the bottom flange 18, side a. The zero angle is perpendicular to that surface. When the dial 26 is at 0°, with its measuring point 38 even with the measuring shelf 20, the reference surface 96 on the dial, side d, is perpendicular to the surface upon which it rests. In this situation, the angle which is measured with respect to the vertical side b is from 0° to 45°. In FIG. 14, the protractor lies with the same side a on the base and 45° angle 84 is attached to the flat surface of the reference bar. Since the angle between side d and side e is 45°, the hypotenuse of triangle 84 is an angle from 45° to 90° with respect to side b from the base upon which the protractor stands. In this case, the artisan adds 45° to the indicia 30.

Figure 15:
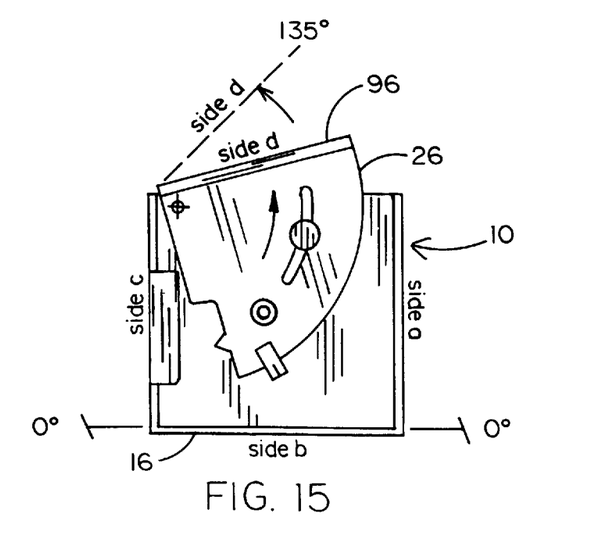
FIG. 15 shows the measurement of an angle between 90° and 135° with respect to the vertical, relative to side c.

FIG. 15 illustrates the manner in which angles from 90° to 135° are measured or set. In this case, the protractor body is set with end 16 on the base. With the L dial 26 set at zero, the surface 96 on the dial is 90° with respect to the side c. Turning dial 26 moves the surface 96 to 135° with respect to the side c. FIG. 16 illustrates the manner in which angles from 135° to 180° are set and measured. In this case, the 45° triangle is placed in the flat surface of the reference bar and, as the dial 26 is moved from zero to 45° on its indicia 30, the hypotenuse of the triangle 84 moves from 135° to 180° with respect to the side c from the base. This is the same as the setup in FIG. 15, but with the 45° triangle 84 added.

To measure angles from 180° to 225°, the protractor 10 is placed with its side c, the surface of top flange 14, on the base. When the witness line reads 0° on the indicia, the measuring surface of the reference bar 86 is at 180°, relative to side b. As the dial 26 is rotated, the reference surface 96 on reference bar 86 moves from 180° to 225°. FIG. 18 illustrates the same setup, with the addition of the 45° triangle 84. With movement of the dial 26 from 0, the hypothenuse of the triangle moves from 225° to 270°, relative to side b, which is parallel to the surface upon which the protractor rests.

By these setups, it is seen that a wide range of angles can be measured with a 45° rotation of the dial. This is accomplished because the surfaces of the flanges are mutually perpendicular to each other. It can be seen that the protractor 10 can be employed to set and/or accurately measure angles and is particularly useful the setting up of machinery, jigs and fixtures.

This invention has been described in its presently contemplated best embodiment, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A protractor comprising:
   a body, said body having at least one reference surface, said body having a first measuring point thereon, a pivot on said body, said first measuring point on said body being a straight surface which is radial to said pivot pin;
   a dial, said dial being rotatably mounted on said pivot, a second measuring point on said dial, a reference surface on said dial, indicia between said dial and said body to indicate the angular position of said reference surface on said dial with respect to said reference surface on said body;
   said first and second measuring points being positioned so that said first and second measuring points move with respect to each other as said dial is rotated with respect to said protractor body and so that the ratio of the distance between said first measuring surface on said body and said second measuring point on said dial divided by the distance between said second measuring point on said dial and said pivot pin is the sine of the angle of said reference surface on said dial to said reference surface on said body.

2. The protractor of claim 1 wherein said second measuring point on said dial is a point on the radial line from said pivot pin which is at a right angle to said reference surface on said dial.

3. The protractor of claim 2 wherein addition to said first reference surface on said body, said body also has a second reference surface parallel to said first reference surface and a third reference surface at a right angle thereto.

4. The protractor of claim 1 wherein addition to said first reference surface on said body, said body also has a second reference surface parallel to said first reference surface and a third reference surface at a right angle thereto.

5. The protractor of claim 1 wherein there is an adjustable stop interengaging between said protractor body and said protractor dial so that said stop can be set when said measuring point on said body and said measuring point on said dial are even with each other.

6. The protractor of claim 5 wherein said body has a web and said indicia comprise indicia on said web and a witness line on said dial, said witness line being adjustable so that it can be set to zero when said measuring points are even.

7. A protractor comprising:
   a protractor body, a first substantially planar reference surface on said protractor body, a first measuring location on said protractor body, a pivot on said protractor body, said first measuring location on said protractor body being a radial surface with respect to said pivot, said pivot having an axis substantially parallel to said plane of said first reference surface; and
   a dial, said dial being pivoted on said pivot on said protractor body, a second measuring point on said dial, said dial having a second reference surface thereon so that distance between said first measuring surface and said second measuring point is a function of the angle between said first reference surface on said protractor body and said second reference surface other as said dial is rotated with respect to said protractor body and so that measurement between said second measuring point and said first measuring surface is the sine function of the angle of said first reference surface on said body with respect to said second reference surface on said dial.

8. The protractor of claim 7 wherein said second reference surface on said protractor dial is on a reference bar which is detachably attached to said dial, said reference bar having a lip thereon, said reference bar being attachable to said dial in either one of two positions so as to selectively position said lip on said reference bar.

9. The protractor of claim 8 wherein said reference bar is made of magnetic material and there is a magnet associated therewith to magnetically attach a magnetic triangle thereto to extend the angle which the protractor can measure.

10. The protractor of claim 8 wherein there is a stop screw on said reference bar, said stop screw being adjustable to engage said body when said measuring location is even with said measurement surface.

11. The protractor of claim 10 wherein there are two stop screws on said reference bar, one for engaging said protractor body in either position of said reference bar.

12. The protractor of claim 7 wherein said body has a plurality of indicia thereon and said dial has an adjustable witness line thereon, said adjustable witness line being adjustable to zero when said measuring point is even with said measuring surface.

13. The protractor of claim 7 wherein said dial has a first memory pin hole therein, a memory link, said memory link having a mounting hole therein and also having a memory pin hole therein and having a mounting hole therein, an attachment device through said mounting hole, said attachment device engaging said body to secure said memory link in a selected position with respect to said body, said memory link being configured so that a memory pin can be inserted through both of said memory pin holes, said memory link secured to said body, said memory pin can be removed, said dial can be moved, and said dial can be returned to the memory position by moving it until said memory pin holes are again in alignment.

14. The protractor of claim 13 wherein said protractor body has a center web and there is an access opening to said memory pin hole in said dial through said access hole in said center web, said memory link being attached to said center web adjacent said access opening.

15. The protractor of claim 14 where said protractor dial lies against said center web and there is a releasable lock interengaging said dial and said center web so that said dial can be locked in a selected position wherein said first and second reference surfaces are at a particular angle with respect to each other.

16. The protractor of claim 7 wherein said body has a center web and said dial is rotatably mounted on said center web, said first measuring surface being on said center web and being positioned in a radial plane with respect to said dial pivot, said first measuring surface and said second measuring point being configured so that a caliper can have its base on said measuring surface and its depth measuring rod on said point so that the measured distance between said measuring surface and said point is the opposite side of a right triangle and the distance between said dial pivot and said measuring point is the hypotenuse so that the sine of the angle between said reference surfaces is known.

17. The protractor of claim 16 wherein said dial has a memory pin hole therein and said body has a memory link movably mounted thereon, said memory link also having a memory pin hole therein, said memory link being configured so that a memory pin can be inserted through both of said memory pin holes, said memory pin can be removed, said dial can be moved, and said dial can be returned to the memory position by moving it until said memory pin holes are again in alignment.

18. The protractor of claim 7 wherein addition to said first reference surface on said body, said body also has a second reference surface parallel to said first reference surface and a third reference surface at a right angle thereto.

19. The protractor of claim 7 wherein there is an adjustable stop interengaging between said protractor body and said protractor dial so that said stop can be set when said measuring point on said body and said measuring point on said dial are even with each other.

* * * * *